W. KELLEY.
Combined Oil-Cans and Torches.
No. 136,738. Patented March 11, 1873.
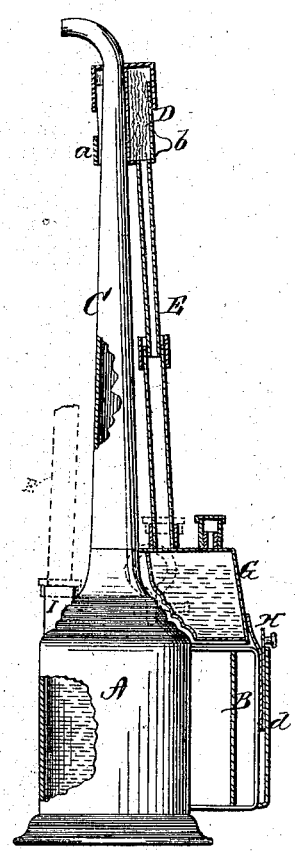
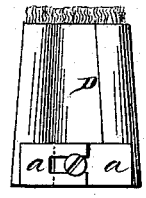
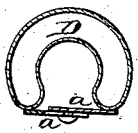
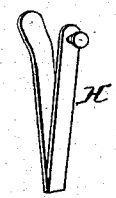
Witnesses
Chas. E. Upperman
P. A. Devine
Inventor.
William Kelley
By T. H. Upperman
Attorney

UNITED STATES PATENT OFFICE.

WILLIAM KELLEY, OF BALTIMORE, MARYLAND, ASSIGNOR OF ONE-HALF HIS RIGHT TO WILLIAM ARMSTRONG, OF MARTINSBURG, W. VA.

IMPROVEMENT IN COMBINED OIL-CANS AND TORCHES.

Specification forming part of Letters Patent No. 136,738, dated March 11, 1873.

*To all whom it may concern:*

Be it known that I, WILLIAM KELLEY, of Baltimore, in the county of Baltimore and State of Maryland, have invented certain new and useful Improvements in Combined Oil-Can and Torch; and I do hereby declare the following to be a full, clear, and exact description thereof, reference being had to the accompanying drawing and to the letters of reference marked thereon.

The nature of my invention consists in the construction and arrangement of a combined oil-can and torch, designed especially for the use of railroad engineers in oiling the various parts of their locomotives.

In order to enable others skilled in the art to which my invention appertains to make and use the same, I will now proceed to describe its construction and operation, referring to the annexed drawing, which forms a part of this specification, and in which—

Figure 1 is a side elevation, partly in section, of my combined oil-can and torch. Fig. 2 shows the torch-reservoir, and Fig. 3 shows the spring for holding the oil-reservoir of the torch to the handle of the oiler.

A represents the oil-can, with handle B and long spout or oiler C, usually employed in oiling machinery, these parts being constructed in any of the known and usual ways. D represents the torch-reservoir, in which the wick is placed, said reservoir being made in half-moon or part circular form, as shown in the section in Fig. 2. At the lower end on the inner side of the reservoir D are attached two springs, *a a*, the loose ends of which are connected by a screw or headed pin in one passing through a slot in the other, and thus forming a spring-band to hold the torch-reservoir at any desired point on the oiler C. The torch D slips over the oiler and the spring-band *a a* accommodates itself on the same, so as to allow of the torch being raised or lowered on the same, which is often necessary, especially when the end of the oiler has to be inserted for some distance in some part of the machinery. On the outer side of the torch-reservoir D is formed or attached a knob or heel, *b*, which may be knocked against anything to move the wick out or in. The usual mode of moving the wick in the torches heretofore used is to knock the torch or the oil-reservoir for the same against the hand. The torch-reservoir D is, by a pipe, E, connected with the oil-reservoir G, said pipe E being an extension pipe, one part sliding in the other, so as to admit of the torch being raised or lowered on the oiler at will. The torch oil-reservoir G is constructed so as to fit and rest upon the oil-can A and its handle B, and to the outer side of the reservoir G is attached a spring-catch, H, which fits into a groove formed by attaching a plate, *d*, on the outside of the handle B, as shown in Fig. 1, thereby securing the whole torch apparatus to the oil-can.

The advantages of thus combining a torch with the oiler are too apparent to need any elaboration here, especially when it is known that heretofore the engineer in oiling his locomotive has either held his oil-can in one hand and torch in the other, or else had another person hold the torch for him. In addition to this advantage, the torch being near the nozzle of the oiler keeps the lubricating material in a fluid state.

The oil usually employed to oil machinery is not such as could be used for illumination. Sometimes, however, the best oil is employed for lubricating purposes, which may also be used for illumination, without the necessity of using a different oil. In this case I simply attach to the oil-reservoir A a short pipe, I, having a diameter of such size, and provided with a screw-thread to receive the extension pipe E, which, as shown, has a separate reservoir, G, to supply the torch-reservoir D. If a certain oil be used which cannot serve for illuminating purposes, the short pipe I may be provided with a screw-top to prevent leakage of the lubricating oil through it, which cap will also fit upon the short pipe connecting with the extension pipe E.

Thus it will be seen that in the same utensil an oiler and torch may be supplied from the same reservoir, or the torch may be supplied from a separate reservoir, with all the characteristic advantages hereinbefore explained.

Having thus fully described my invention, what I claim as new, and desire to secure by Letters Patent, is—

1. In combination with an oiler, A B C, a torch slipping over the oiler, and capable of being raised or lowered on the same, substantially as and for the purposes herein set forth.

2. The spring-band *a a*, constructed as described, and attached to the torch wick-reservoir D, substantially as and for the purposes herein set forth.

3. The knob or heel *b* on the reservoir D, for the purposes herein set forth.

4. The oil-reservoir G for the torch, constructed as shown, so as to rest upon the oil-can A and handle B, as set forth.

5. In combination with the torch wick-reservoir D and torch oil-reservoir G, the extension pipe E, for the purposes herein set forth.

6. The spring-catch H attached to the reservoir G, and catching in the handle B, substantially as and for the purposes herein set forth.

In testimony whereof I have hereunto signed my name.

WILLIAM KELLEY.

Witnesses:
WALTER M. KELLEY,
EDM. F. BROWN.